(12) United States Patent
Yamamiya

(10) Patent No.: US 6,445,660 B1
(45) Date of Patent: *Sep. 3, 2002

(54) APPARATUS FOR RECORDING AND/OR REPRODUCING INFORMATION AND/OR FROM OPTICAL INFORMATION RECORD DISK

(75) Inventor: Kunio Yamamiya, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/928,366

(22) Filed: Aug. 14, 2001

Related U.S. Application Data

(63) Continuation of application No. 09/576,026, filed on May 23, 2000, now Pat. No. 6,310,849, which is a continuation of application No. 09/320,460, filed on May 27, 1999, now Pat. No. 6,078,550, which is a continuation of application No. 09/182,890, filed on Oct. 30, 1998, now Pat. No. 5,940,357, which is a continuation of application No. 08/744,558, filed on Nov. 6, 1996, now Pat. No. 5,862,110, which is a continuation of application No. 08/466,433, filed on Jun. 6, 1995, now abandoned, which is a continuation of application No. 08/225,977, filed on Apr. 12, 1994, now Pat. No. 5,446,711.

(30) Foreign Application Priority Data

Apr. 12, 1993 (JP) .............................................. 5-084637

(51) Int. Cl.⁷ ................................................ G11B 7/00
(52) U.S. Cl. .................................. 369/53.37; 369/44.27
(58) Field of Search .......................... 369/44.27, 75.2, 369/77.2, 53.3, 53.37, 47.39, 47.5, 47.55, 116, 53.29, 53.26, 13.12, 13.21, 13.26

(56) References Cited

U.S. PATENT DOCUMENTS

| | | |
|---|---|---|
| 4,850,695 A | 7/1989 | Mikuriya et al. |
| 4,882,723 A | 11/1989 | Van Rosmalen |
| 4,918,678 A | 4/1990 | Dolby |
| 5,123,005 A | 6/1992 | Kurosu |
| 5,218,593 A | 6/1993 | Kaneo et al. |
| 5,414,687 A | 5/1995 | Ohmuri et al. |
| 5,416,762 A | * 5/1995 | Ohmori et al. ............ 369/75.2 |
| 5,446,711 A | 8/1995 | Yamamiya |
| 5,917,785 A | 6/1999 | Masaki et al. |

FOREIGN PATENT DOCUMENTS

| | | |
|---|---|---|
| JP | 536184 | 2/1983 |
| JP | 135415 B2 | 9/1984 |
| JP | 62154234 | 7/1987 |
| JP | 6489027 A | 4/1989 |
| JP | 6489068 | 4/1989 |
| JP | 1232567 | 9/1989 |
| JP | 458813 | 5/1992 |
| JP | 4307427 A | 10/1992 |
| JP | 4321972 A | 11/1992 |
| JP | 04321972 | 11/1992 |
| JP | 4351785 A | 12/1992 |
| JP | 4362560 | 12/1992 |
| JP | 4362562 | 12/1992 |
| JP | 520759 A | 1/1993 |

* cited by examiner

Primary Examiner—Thang V. Tran
(74) Attorney, Agent, or Firm—Stevens, Davis, Miller & Mosher, LLP

(57) ABSTRACT

An apparatus for recording and/or reproducing information on and/or from a magneto-optical disk including an optical head for projecting a laser beam onto a magneto-optical disk and receiving the laser beam reflected by the disk, an up-down block arranged movably between a lower position and an upper position, an up-down motor for moving said up-down block up and down, a turntable for supporting the disk and a spindle motor secured to said up-down block and having a driving shaft coupled with said turntable for rotating the turntable, a position detecting device for detecting a position of said up-down block to derive a position signal when the up-down block is driven into the upper position, a rotation detecting device for detecting a rotation of said optical information record disk to derive a rotation signal when the optical information record disk is rotated at a predetermined revolving speed, and a control device for initiating a focus control for moving said objective lens and turntable relative to each other in accordance with said position signal and rotation signal.

63 Claims, 9 Drawing Sheets

FIG_3

FIG_5

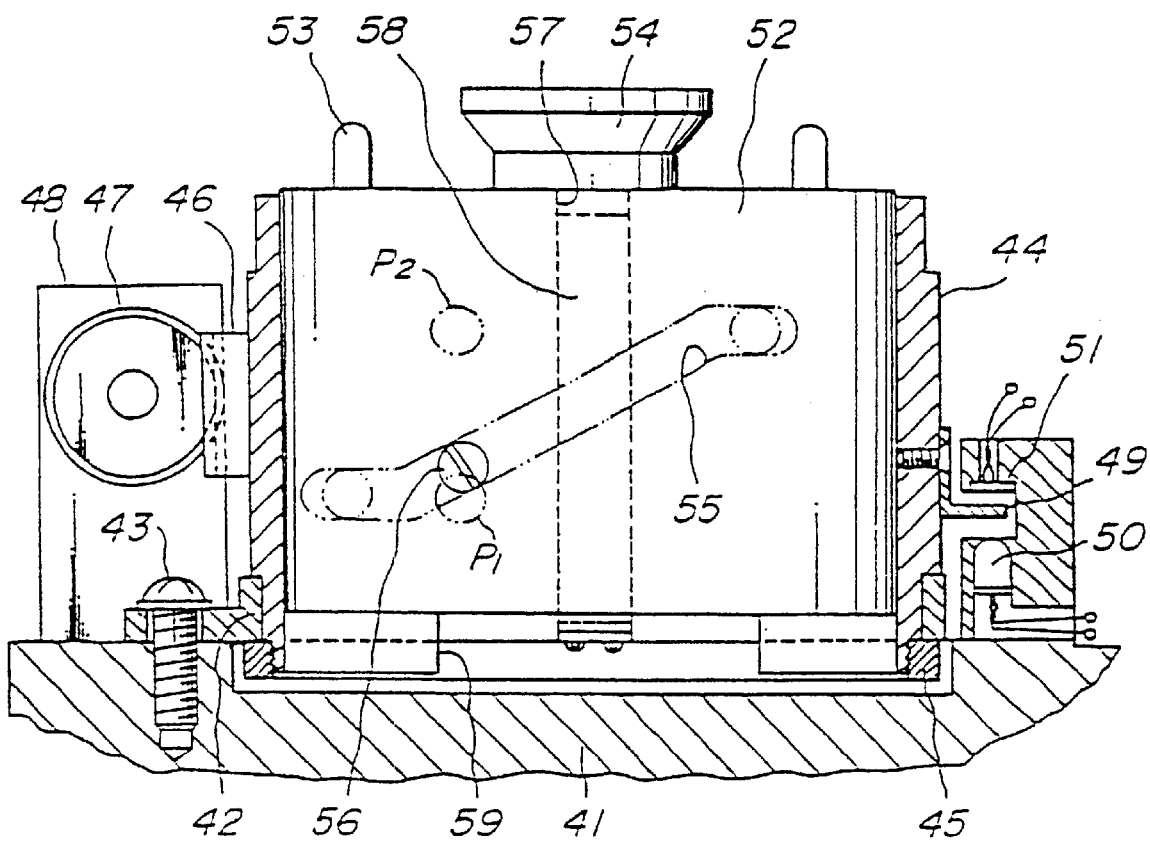
FIG_9
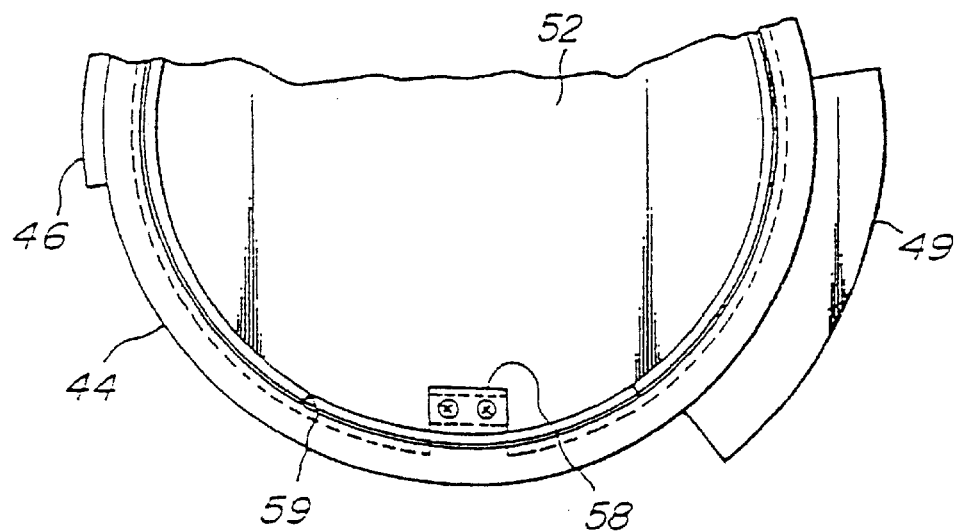
FIG_10

APPARATUS FOR RECORDING AND/OR REPRODUCING INFORMATION AND/OR FROM OPTICAL INFORMATION RECORD DISK

This application is a continuation of application Ser. No. 09/576,026, filed May 23, 2000 (U.S. Pat. No. 6,310,849, which was a continuation of application Ser. No. 09/320,460, filed May 27, 1999 (U.S. Pat. No. 6,078,550), which was a continuation of application Ser. No. 09/182,890 (U.S. Pat. No. 5,940,357), filed Oct. 30, 1998, which was a continuation of application Ser. No. 08/744,558, filed Nov. 6, 1996 (U.S. Pat. No. 5,862,110), which was a continuation of application Ser. No. 08/466,433, filed Jun. 6, 1995 (abandoned), which was a continuation of application Ser. No. 08/225,977, filed Apr. 12, 1994 (U.S. Pat. No. 5,446,711).

BACKGROUND OF THE INVENTION

1. Field of the Invention

The present invention relates to an apparatus for recording and/or reproducing information on and/or from an optical record disk comprising an optical head including a semiconductor laser for emitting a laser beam, an objective lens for projecting the laser beam emitted by the semiconductor laser onto the optical information record disk and a photo-detecting means for receiving a return laser beam reflected by said optical information record disk to produce information signal and focusing error signal; a disk driving device including a turntable for supporting the optical information record disk and s spindle motor for rotating said turntable together with the optical information record disk; means for driving at said objective lens in a radial direction of the optical information record disk; and a control means for performing a focus control for moving said objective lens and turntable relative to each other for moving a relative position of a focus point of the laser beam with respect to the optical information record disk in a focusing direction which is parallel with an optical axis of said objective lens.

2. Related Art Statement

In Japanese Patent Application Publication No. 1-35415 published on Jul. 25, 1989, there is described a known apparatus for recording and/or reproducing information on and/or from an optical information record disk such as the magneto-optical record disk. In this known apparatus, when the cartridge having an optical disk installed therein is inserted into the apparatus, the cartridge is inserted into a holder of a cartridge loading mechanism and this holder is movably arranged on a driving member, and when the cartridge is fully inserted into the holder, the driving member is moved downward so that the optical disk is placed on a turntable which is coupled with a driving shaft of a spindle motor. In this apparatus, the optical disk can be place on the turntable without moving the spindle motor and turntable up and down, so that the disk driving device may be simple in construction. However, the holder has to be moved not only horizontally, but also vertically, and therefore the mechanism for driving the holder is liable to be complicated and a stable operation could be hardly attained.

In order to avoid the above mentioned drawbacks, there has been proposed another known apparatus described in Japanese Patent Application Laid-open Publication Kokai Hei No. 4-321972 published on Nov. 11, 1992. In this known optical information record disk apparatus, after a cartridge having a magneto-optical record disk installed therein is inserted into the apparatus, a spindle motor for rotating the optical disk is moved upward such that the optical disk is supported by a turntable provided on a driving shaft of the spindle motor. In this known apparatus, it is no more necessary to provide a mechanism for descending the cartridge in the cartridge loading mechanism, and thus its construction becomes simple and small. Further, in this known apparatus, a focus control including focus search and focus servo is performed by moving the spindle motor, turntable and optical disk in a direction parallel with an axis of the spindle motor such that a distance between the objective lens and the information record plane of the optical disk is changed. Therefore, it is no more necessary to provide, in the optical head, an objective lens driving mechanism for moving the objective lens in a direction of its optical axis and thus the optical head can be made small in size and light in weight. It should be noted that the focus servo control means a control for adjusting a distance between the objective lens and the optical disk in accordance with a focusing error signal by means of a focus servo mechanism so that the light beam is correctly focused on the optical disk, and the focus search control means a control for setting said distance within a controllable range of the focus servo mechanism.

In this known apparatus, the spindle motor is secured to an up-down block, and turntable and cartridge positioning member are secured to the up-down block. When the up-down block is moved upward, a lower surface of the cartridge is supported by projections of the cartridge positioning member and an optical disk installed within the cartridge is supported on the turntable. The disk is firmly secured onto the turntable by means of a permanent magnet. The up-down block is moved up and down by a cum mechanism including a cum gear and a up-down motor for rotating the cum gear by means of a gear box, a cum surface of said cum gear being engaged with a roller arranged rotatably on a side surface of the up-down block. A rotation of the cum gear is detected by a rotary encoder, so that a position of the up-down block can be detected by processing an output signal of the rotary encoder.

In this known apparatus, the position of the up-down block is not directly detected, but is presumed from the rotation of the cum gear. By such an indirect detection, the position of the up-down block could not be accurately detected owing to the reason that the gears contain back rush and thus the output signal detected by the rotary encoder could not precisely represent an amount of the actual up-down movement of the up-down block. It should be noted that the focus control including the focus search and focus servo has to be performed in relation to a position of a movable portion including the up-down block, turntable, cartridge positioning member and spindle motor, but in the known apparatus the position of the movable member could not be detected precisely and it is no more possible to perform the focus control precisely.

Further, in the known disk driving device, substantial parts of the device including the up-down block, spindle motor, turntable and cartridge positioning member are moved up and down, and thus a relatively heavy load is applied to the up-down motor. Therefore, the up-down motor is liable to be large. Moreover, during the focus control, not only the turntable, but also the up-down block and spindle motor are moved up and down, the projections of the cartridge positioning member might vibrate and thus the projections might hit the cartridge to produce annoying noise.

SUMMARY OF THE INVENTION

The present invention has for its object to provide a novel and useful apparatus for recording and/or reproducing information on and/or from an optical information record disk, in which the position of the up-down block can be detected precisely, so that the focus control can be carried out accurately and reliably.

It is another object of the invention to provide a novel and useful apparatus for recording and/or reproducing information on and/or from an optical information record disk, in which the focus control can be performed without moving the up-down block and spindle motor, so that the focus control can be effected accurately.

It is still another object of the invention to provide a novel and useful apparatus for recording and/or reproducing information on and/or from an optical record disk, in which a focus control can be initiated stably and reliably.

According to the invention, an apparatus for recording and/or reproducing information on and/or from an optical record disk comprises:

an optical head including a semiconductor laser for emitting a laser beam, an objective lens for projecting the laser beam emitted by the semiconductor laser onto the optical information record disk and a photodetecting means for receiving a return laser beam reflected by said optical information record disk to produce information signal and focusing error signal;

a disk driving means including an up-down block arranged movably in a direction perpendicular to a plane of the optical information record disk between a lower position and an upper position, an up-down motor for moving said up-down block between said lower position and upper position, a turntable for supporting the optical information record disk and a spindle motor secured to said up-down block and having a driving shaft coupled with said turntable for rotating the turntable together with the optical information record disk;

an optical head driving means for driving at least said objective lens in a radial direction of the optical information record disk;

a position detecting means for detecting directly a position of said up-down block to derive a position signal when the up-down block is driven into said upper position;

a rotation detecting means for detecting a rotation of said optical information record disk to derive a rotation signal when the optical information record disk is rotated at a predetermined revolving speed; and a control means for initiating a focus control for moving said objective lens and turntable relative to each other in accordance with said position signal and rotation signal.

According to a preferable embodiment of the apparatus according to the invention, said turntable of said driving means is arranged on a driving shaft of said spindle motor such that the turntable is rotated together with the driving shaft but is slidable along the driving shaft, and said disk driving means comprises a first driving device for moving the up-down block up and down and a second driving device for moving said turntable up and down along the driving shaft of the spindle motor.

According to further aspect of the invention, an apparatus for recording and/or reproducing information on and/or from an optical record disk comprises:

an optical head including a semiconductor laser for emitting a laser beam, an objective lens for projecting the laser beam emitted by the semiconductor laser onto the optical information record disk and a photodetecting means for receiving a return laser beam reflected by said optical information record disk to produce information signal and focusing error signal;

a disk driving means including an up-down block arranged movably in a direction perpendicular to a plane of the optical information record disk between a lower position and an upper position, an up-down motor for moving said up-down block between said lower position and upper position, a turntable for supporting the optical information record disk and a spindle motor secured to said up-down block and having a driving shaft coupled with said turntable for rotating the turntable together with the optical information record disk;

an optical head driving means for driving at least said objective lens in a radial direction of the optical information record disk;

a position detecting means for detecting directly a position of said up-down block to derive a position signal when the up-down block is driven into said upper position;

a control means for initiating an energization of said spindle motor for rotating the optical information record disk in accordance with said position signal.

BRIEF DESCRIPTION OF THE DRAWINGS

FIG. 9 is a cross sectional view depicting another embodiment of the disk driving device according to the invention; and FIG. 10 is a bottom view of the device illustrated in FIG. 9.

DESCRIPTION OF THE PREFERRED EMBODIMENTS

Now the present invention will be explained in detail with reference to the drawings.

Figure 1:
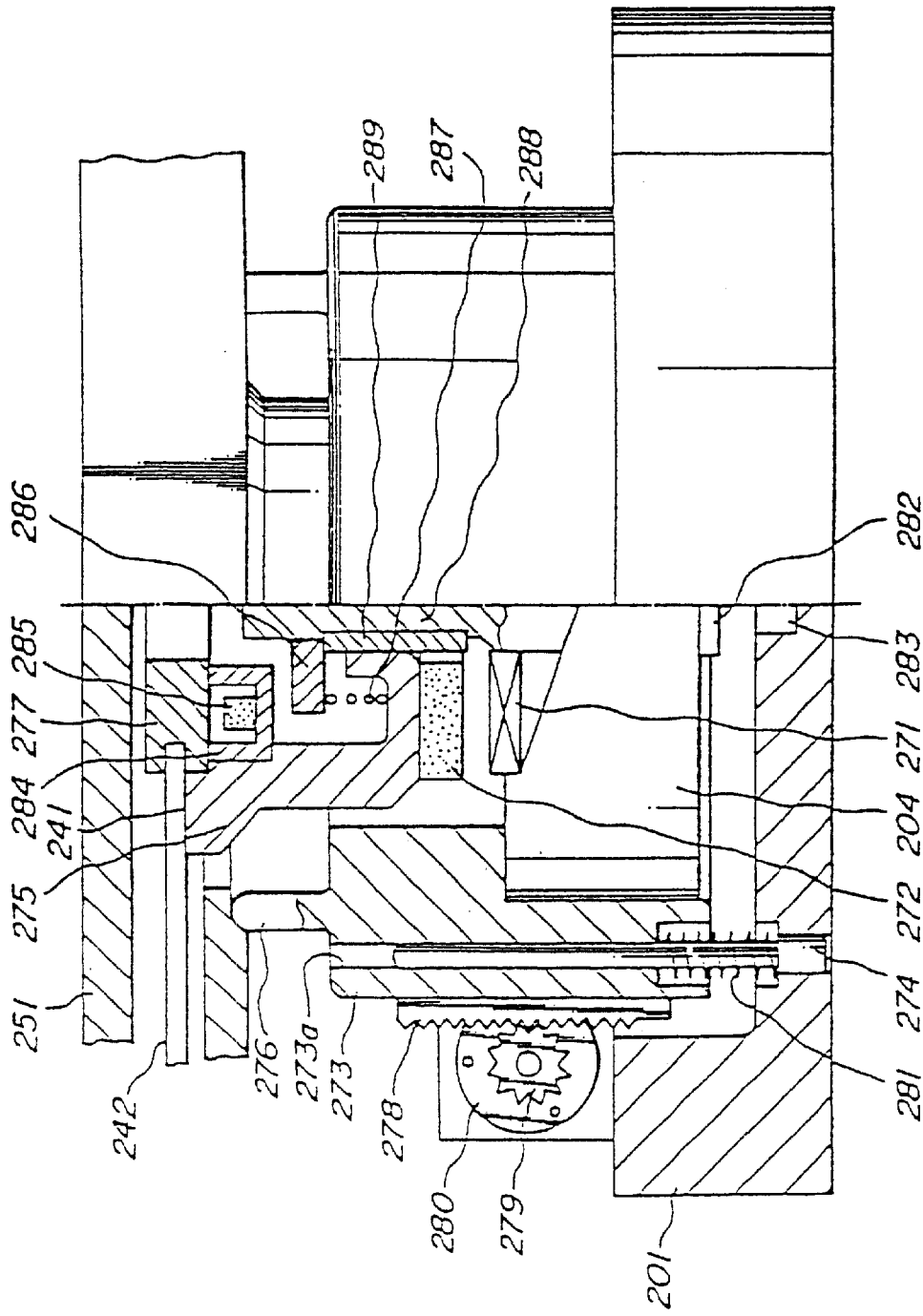
FIG. 1 is a half cross sectional and half front view showing an embodiment of the disk driving means of the optical information recording and/or reproducing apparatus according to the invention.
Figure 2:
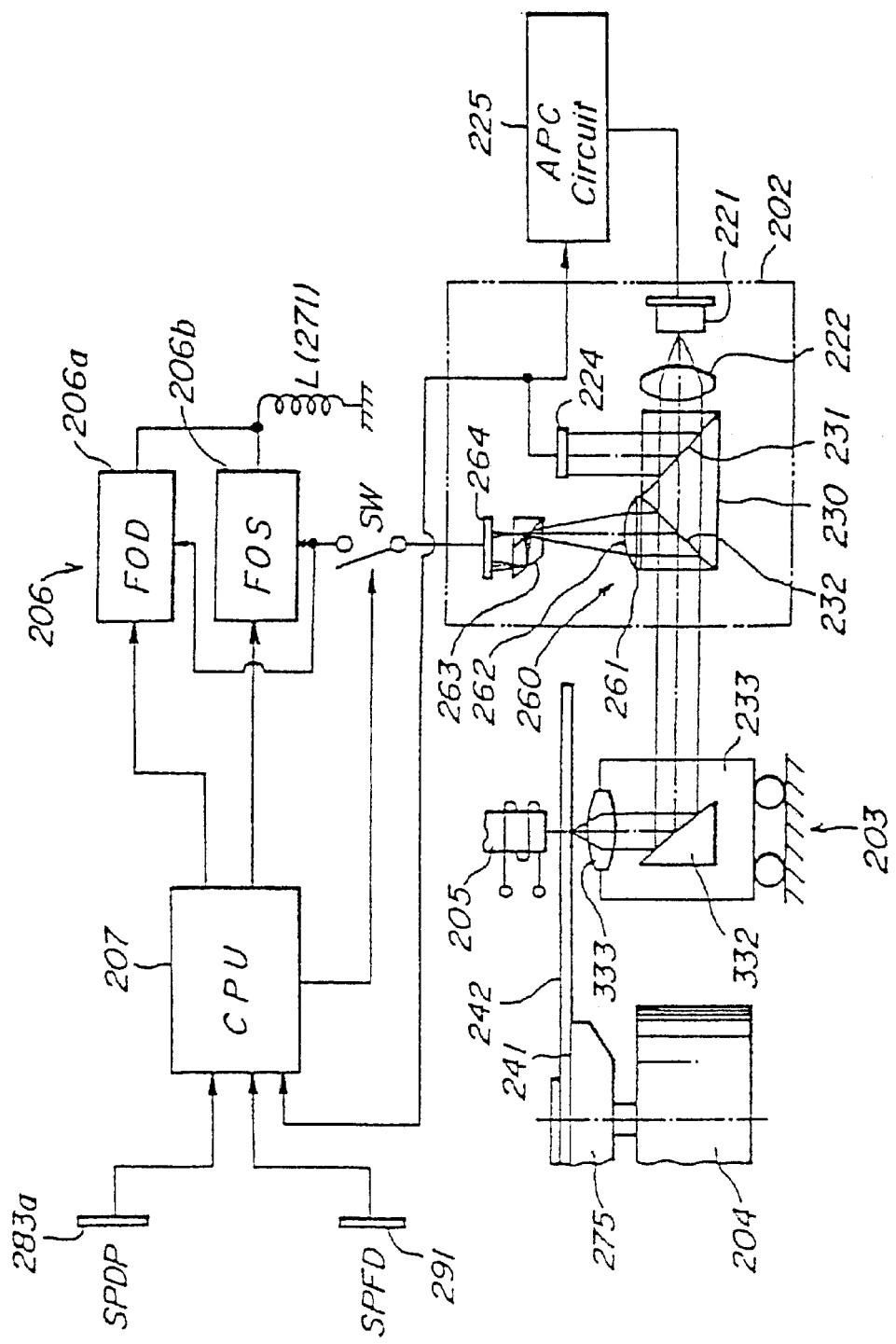
FIG. 2 is a schematic view depicting a whole construction of the apparatus.

FIG. 1 is a half cross sectional and half front view of a disk driving device of an embodiment of the optical information recording and/or reproducing apparatus according to the invention. In the present embodiment, a magneto-optical disk installed within a cartridge is supported by a turntable formed by a spindle cup and is rotated by a spindle motor. FIG. 2 shows an optical head and a focus control system of the present embodiment.

As shown in FIG. 1, the disk driving device comprises a main body 201 and a spindle motor 204 which is arranged above the main body movably up and down by means of an up-down block 273. That is to say, the spindle motor 204 is secured to the up-down block 273 which is arranged movably up and down. On a driving shaft 288 of the spindle motor 204, a spindle cup 275 is arranged slidably along the driving shaft, but is rotated together with the driving shaft 288. To this end, a key 289 extending in an axial direction of the driving shaft 288 is secured to the driving shaft and this key is slidably inserted into a recess formed in an inner wall of the spindle cup 275. An upper surface of the spindle cup 275 forms a turntable 241 for the optical disk as will be explained later.

To an upper portion of the spindle motor 204 is secured a ring-shaped electromagnet 271, and a ring-shaped permanent magnet 272 is secured to a bottom surface of the spindle cup 275 such that they are faced with each other. As will be explained later, the permanent magnet 272 is rotated by the spindle motor 204 and the electromagnet 271 is sometimes brought into contact with the rotating permanent magnet 272. In order to prevent the electromagnet 271 from being damaged by said sliding contact, the electromagnet is covered with a plastic housing.

In the up-down block 273, there are formed through holes 273a extending in parallel with an axial direction of the driving shaft of the spindle motor 204, and guide shafts 274 secured to the main body 201 are inserted into the through holes such that the up-down block 273 is smoothly moved up and down along the guide shafts 274. The up-down block 273 extends in the axial direction such that it substantially surrounds the spindle cup 275 and includes at least three projections 276. When the up-down block 273 is driven into an upper position, round front ends of the projections 276 are brought into contact with a round edge of a recess formed in a lower surface of the cartridge 251, so that the cartridge is positioned with respect to the up-down block 273 and thus the driving shaft 288 of the spindle motor 204. It should be noted that tips of these projections 276 situate on a plane which is perpendicular to the axial direction of the driving shaft 288.

To a side wall of the up-down block 273 is secured a rack gear 278 which engages with a pinion gear 279, and this pinion gear 279 is driven by an up-down motor 280 arranged on the main body 201. Therefore, by driving the up-down motor 280, it is possible to move the up-down block 273 and thus the spindle motor 204 up and down. Between the main body 201 and the lower surface of the up-down block 272 at the guide shafts 274, there are arranged compressing coiled springs 281 such that the up-down block is biased to move upward.

On a lower surface of the spindle motor 204 there is secured a light reflecting member 282 by an adhesive agent. The light reflecting member 282 comprises a glass plate on which a metal thin film is coated. The glass plate may be formed in a wedge-shaped one. On the main body 201 there is secured a photoreflector 283 by an adhesive agent at a position corresponding to the reflecting member 282. The photoreflector 283 is well known in the art and may be formed by a unit including a light emitting diode and two light receiving regions.

The magneto-optical disk 242 installed within the cartridge 251 has a disk hub 277 made of magnetic material secured to a central hole of the disk by means of an adhesive agent. To the spindle cup 275 is secured a ring-shaped magnetic yoke 284 and a ring-shaped permanent magnet 285 is secured to the yoke. Therefore, when the spindle cup 275 is moved upward and a distance between the yoke 284 and the magnetic hub 277 of the disk 242 becomes smaller than a given value, the disk hub 277 is attracted by the yoke 284 as illustrated in FIG. 1. In this manner, according to this embodiment, when the up-down block 273 is moved upward by means of the up-down motor 280, the positioning of the disk 242 with respect to the axis of the spindle cup 275 can be obtained and at the same time the magneto-optical disk 242 is firmly coupled with the spindle cup.

In the present embodiment, the up-down block 273 having the spindle motor 204 secured thereto and the spindle cup 275 can be moved up and down independently from each other. That is to say, the spindle cup 275 is coupled with the driving shaft 288 of the spindle motor 204 such that the spindle cup can be moved up and down with respect to the driving shaft by supplying a driving current to the electromagnet 271. Therefore, the focus search and focus servo can be performed without moving the up-down block 273. On the other hand, the spindle cup 275 has to be rotated by the spindle motor 204, so that the spindle cup is coupled with the driving shaft of the spindle motor 204 by means of a key and recess coupling mechanism. That is to say, a key 289 extending in the axial direction of the driving shaft 288 is secured to the driving shaft, and a recess is formed in a side wall of the spindle cup 275, said key being inserted into the recess.

In the present embodiment, there are provided the first driving mechanism (278, 279, 280) for moving the up-down block 273, i.e. the spindle motor 204 in the up and down directions with respect to the spindle cup 275 and the second driving mechanism (271, 272) for moving the spindle cup 275 in the up and down directions with respect to the spindle motor 204.

To the driving shaft of the spindle motor 204 is secured a stopper 286, and between the stopper 286 and the spindle cup 275 is arranged a coiled spring 287 for biasing the spindle cup downward. Therefore, when the electromagnet 271 is not energized, the spindle cup 275 is driven to the lower position so that the permanent magnet 272 is brought into contact with the electromagnet 271.

As illustrated in FIG. 2, the optical pick-up apparatus comprises a stational optical unit 202 and an objective lens driving unit 203, these units being arranged on the main body 201. The stational optical unit 202 comprises semiconductor laser 221, collimator lens 222, prism 230 having first and second beam splitters 231 and 232, half wavelength plate 261, collecting lens 262, polarizing beam splitter 263 and first and second photodetectors 224 and 264. The objective lens driving unit 203 comprises a carriage 233, reflection prism 332 and objective lens 333. The carriage 233 is arranged movably in a radial direction of the magneto-optical disk 242 by means of a suitable driving mechanism such as a linear motor not shown. A laser beam emitted by the semiconductor laser 221 is converted into a parallel beam by means of the collimator lens 222 and is then made incident upon the first beam splitter 231. A laser beam reflected by the first beam splitter 231 is received by the first photodetector 224 and an output signal of the first photodetector is supplied to an automatic power control circuit (APC) 225 which controls the output power of the semiconductor laser 221 in accordance with the output signal from the first photodetector 224.

The output signal of the first photodetector 224 is also supplied to a control device (CPU) 207 of a focus control system. The focus control system includes in addition to this CPU 207 focus driving circuit 206 and switch SW. In order to initiate the focus search or focus control, to the control device 207 are supplied a detection signal of the rotation of the magneto-optical disk 242 and a detection signal of the up-down movement of the spindle motor 204. That is to say, an output signal SPDP of the photoreflector 283 and an output signal of an encoder (not shown) for detecting the rotation of the spindle motor 204 are supplied to the control device 207. The switch SW is controlled by the control device 207 in accordance with these output signals. The above mentioned electromagnet 271 is connected to the driving circuit 206.

A laser beam transmitted through the first beam splitter 231 is then made incident upon the second beam splitter 232 and a laser beam transmitted through the second beam splitter 232 emanates from the stational optical unit 202 toward the objective lens driving unit 203.

Now the carriage 233 of the objective lens driving unit 203 will be explained in detail.

Figure 3:
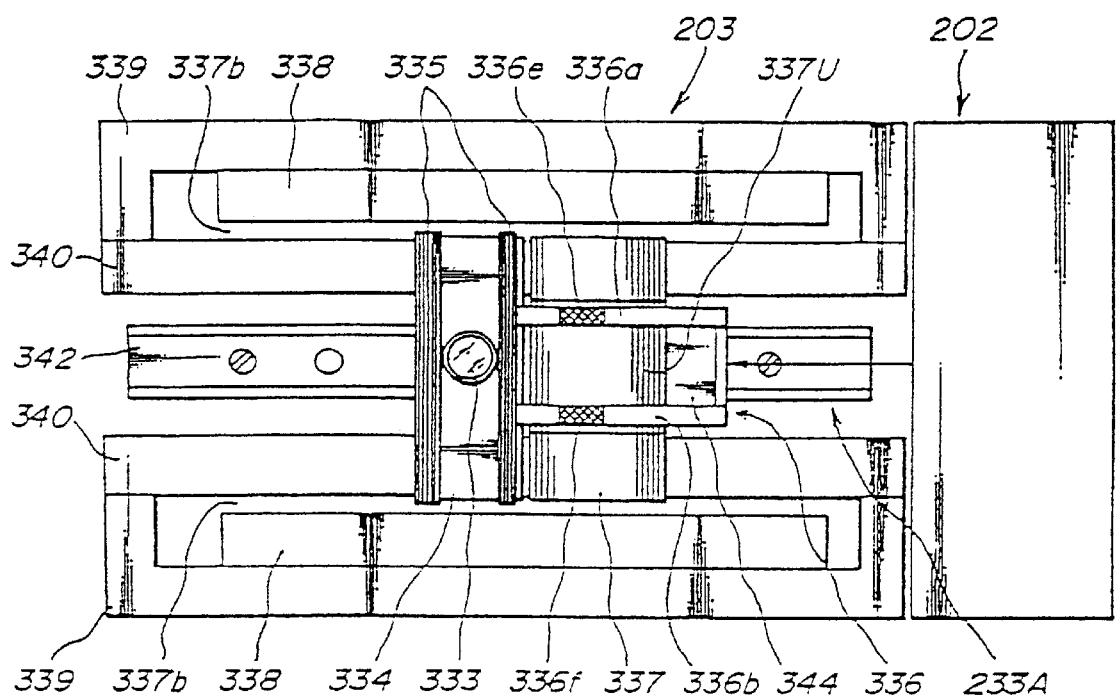
FIG. 3 is a plan view representing the objective lens driving unit.
Figure 4:
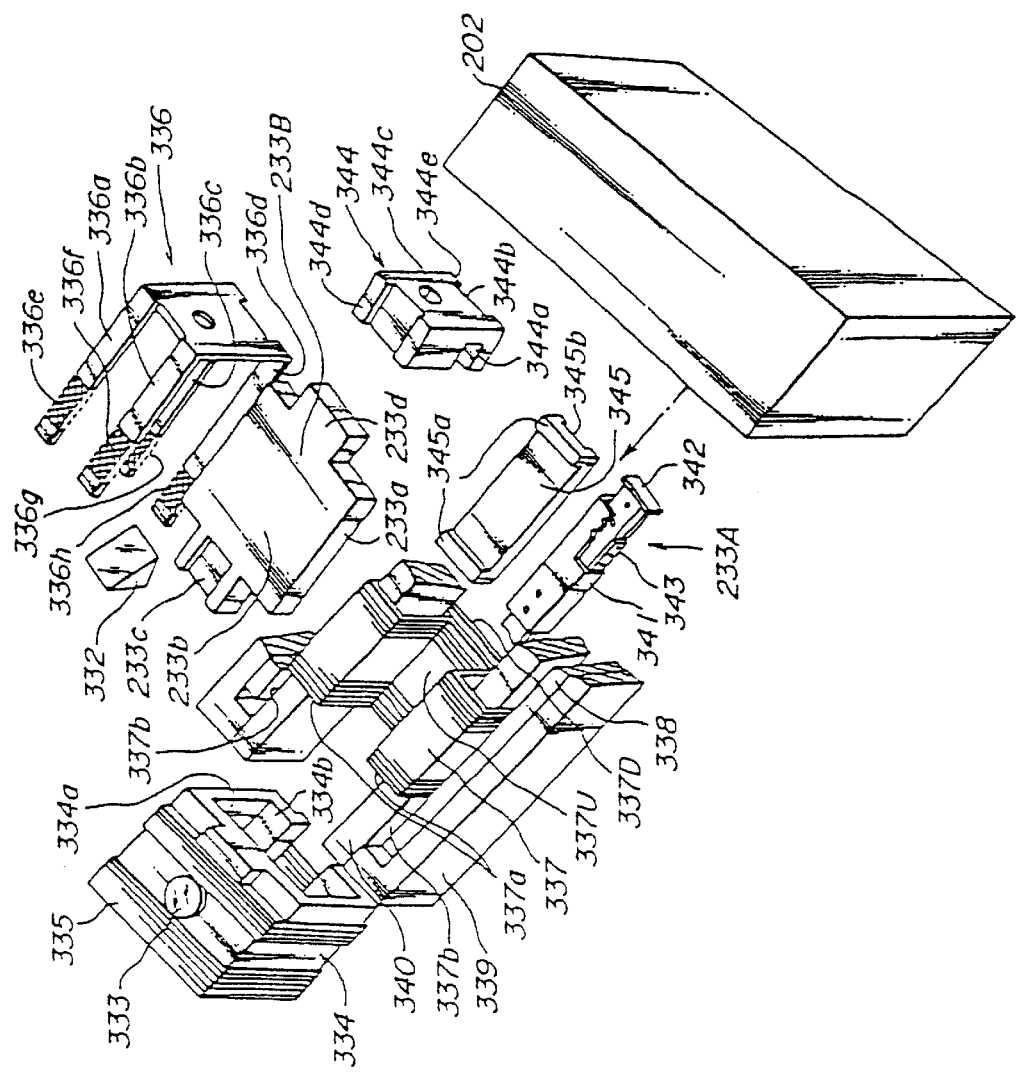
FIG. 4 is a perspective exploded view illustrating the objective lens driving unit.

FIGS. 3 and 4 are plan and exploded perspective views, respectively showing the carriage 233. The carriage 233 is arranged on a slide guide 233A comprising movable portion 341, elongated stationary member 342 secured to the main body 201 and retainer 343 and is moved along the slide guide in the radial direction of the magneto-optical disk 242.

A carriage main body 233B is formed by a plate-like member, and this plate-like member is inserted between upper and lower coil portions 337U and 337D of an access coil 377 and is secured to the access coil. That is to say, lower and upper surfaces 233a and 233b of the plate-like member 233B are cemented to the lower and upper coil portions 337D and 377U, respectively by means of an adhesive agent.

The reflecting prism 332 of the objective lens driving unit 203 is mounted on a projection 233c of the carriage main body 233B and is secured thereto by cementing. The objective lens 333 is supported by a lens holder 344 in the form of a box having openings, and the reflecting prism 332 and projection 233c are inserted into the lens holder through one opening such that the reflecting prism 332 faces the objective lens 333.

A projection 233d of the carriage main body 2333 is inserted into a recess 344a formed in a supporting block 344 and is secured thereto by an adhesive agent. In this manner, the supporting block 344 is fixed to the carriage main body 233B.

In a lower surface of the supporting block 344 there is formed a depression 344b into which the movable portion 341 can extend. In the supporting block 344 there is further formed a through hole 344c for passing the laser beam. Surfaces of side projections 344d and 344e formed in the upper and lower surfaces of the supporting block 334 are secured to a base portion of a leaf spring unit 336 by cementing. The leaf spring unit 336 comprises four leaf springs 336a to 336d whose free ends are secured to the lens holder 334. In this manner, the lens holder 334 and thus the objective lens 333 can be supported to be resiliently moved at least in a focusing direction parallel with an optical axis of the objective lens 333 as well as a tracking direction perpendicular both to the optical axis and an information track on the magneto-optical disk 242.

On the lens holder 334 there are wound tracking coils 335 which are inserted into spaces 337b formed between permanent magnets 338 and inner yokes 340 which constitute a magnetic circuit of the linear motor together with outer yokes 339. The access coil 337 is arranged to surround or embrace the inner yokes 340, so that the movable portion including the access coil 337, carriage main body 233w, supporting block 344 and lens holder 334 is moved linearly along the slide guide 233A by supplying a current to the access coil.

As explained above the front ends of the leaf springs 336a to 336d are secured to the lens holder 334. The leaf springs 336a to 336d have expanding and shrinking portions 336e to 336h, respectively, each of which is formed by a mesh woven from very fine wires and a rubber coating applied on the mesh. When the lens holder 334 is moved in the tracking direction, the expanding and shrinking portions 336e to 336h are deformed in a plane of the drawing of FIG. 3. Further, the lens holder 334 can be moved in the radial direction of the magneto-optical disk 242 even if the carriage main portion 233B is stationary.

The carriage main body 233B is guided along the slide guide 233A by means of an intermediate member 345. That is to say, upper surfaces 345a of upper projections of the intermediate member 345 are cemented onto the lower surface of the carriage main body 233B such that the portion 337U of the access coil 377 is clamped between the intermediate member and the carriage main body, and further the movable portion 341 is clamped into a recess 345b formed in the lower surface of the intermediate member 345 and is cemented thereto by a suitable adhesive agent.

The permanent magnets 338 and outer and inner yokes 339 and 340 are secured to the main body 201 and the outer and inner yokes are coupled with each other at their ends to form the closes magnetic circuits. It should be noted that sizes of the lens holder 344, access coil 337, permanent magnet 338 and yokes 339, 340 is are so determined that the smooth movement of the carriage main body 233B is not affected.

When the current is supplied to the access coil 337, the carriage main body 233B is moved together with the movable portion 341 in the radial direction of the magneto-optical disk 242 along the slide guide 233A. Further the tracking control can be performed by supplying the tracking control signal to the tracking coils 335. That is to say, the tracking coils 335 cooperate with the magnetic field formed by the permanent magnets 338 and yokes 339, 340 to move the carriage main body 233B, i.e. the lens holder 334 in the radial direction of the disk 242. In this manner, according to the invention, the magnetic circuit composed of the permanent magnets 338 and yokes 339, 340 is utilized both for the linear movement of the carriage main body 233B and the tracking control. Furthermore, according to the invention, the focus search and focus control are performed not by moving the objective lens 333 in the direction of its optical axis, but by moving the magneto-optical disk 242 by means of the electromagnet 271 and permanent magnet 272. Therefore, it is not necessary to provide the focusing mechanism including the permanent magnet and focusing coil in the lens holder, so that the objective lens driving device 203 can be further made small in size and light in weight and can be manufactured easily in a less expensive manner.

The parallel laser beam emanating from the stationary unit 202 is made incident upon the reflecting prism 332 and is reflected thereby upwardly and is made incident, upon the objective lens 333. The laser beam is then made incident upon the magneto-optical disk 242. The return laser beam reflected by the magneto optical disk 242 is made incident upon the stationary unit 202 by means of the objective lens 333 and reflecting prism 332.

The return laser beam is reflected by the second beam splitter 232 in the optical system 260 and is made incident upon the half wavelength plate 261 so that its polarizing direction is rotated by 45 degrees. Then the return beam is made incident upon the polarizing beam splitter 263 by means of the collecting lens 262. The polarizing beam splitter 263 serves as the analyzer and P-polarized component is transmitted through the polarizing beam splitting plane and S-polarized component is reflected by the polarizing beam splitting plane, and these P-polarized and S-polarized components are received by separate light receiving elements of the photodetector 264.

By suitably processing outputs of the light receiving elements of the photodetector 264, it is possible to derive a focusing error signal representing a deviation of the focuses spot of the beam with respect to the information record plane of the magneto-optical disk 242 in the direction of the optical axis, a tracking error signal denoting a deviation of the focus point of the beam with respect to the information track in the radial direction, and an information signal representing the information recorded on the magneto-optical disk.

As shown in FIG. 2, there is provided a magnetic head 205 above the disk 242 and the magnetic head is secured to a supporting arm not shown. The supporting arm is driven such that the magnetic head 205 is always indexed into a position facing the objective lens driving unit 203 via the disk 242.

The focusing error signal is supplied to a focus control circuit 206 by means of the switch SW controlled by the control device 207. The focus control circuit 206 comprises focus servo control circuit (FOD) 206a and focus search control circuit (FOS) 206b. Output terminals of the focus servo control circuit 206a and focus search control circuit 206b are connected to a coil L of the electromagnet 271 arranged on the spindle motor 204. By supplying a control signal having a suitable polarity to the coil L from the focus control circuit 206, the electromagnet 271 generates a magnetic field having a given direction to produce the repelling force in combination with the permanent magnet 272, so that the spindle cup 275 on which the disk 242 is mounted is moved upward against the spring force of the coiled spring 287 and the magneto-optical disk 242 is moved away from the objective lens 333. In this manner, by changing the magnitude of the control signal, the distance between the disk 242 and the objective lens 333 can be adjusted in combination of the repelling force produced by the electromagnet 271 and permanent magnet 272 and the resilient force of the coiled spring 287.

In the present embodiment, the control device 207 controls not only the focus control system but also other control systems. For instance, the spindle motor 204, up-down motor 280, linear motor for driving the objective lens driving unit 203, semiconductor laser 221, and tracking coils 335 may be controlled by the control device 207.

Figure 5:
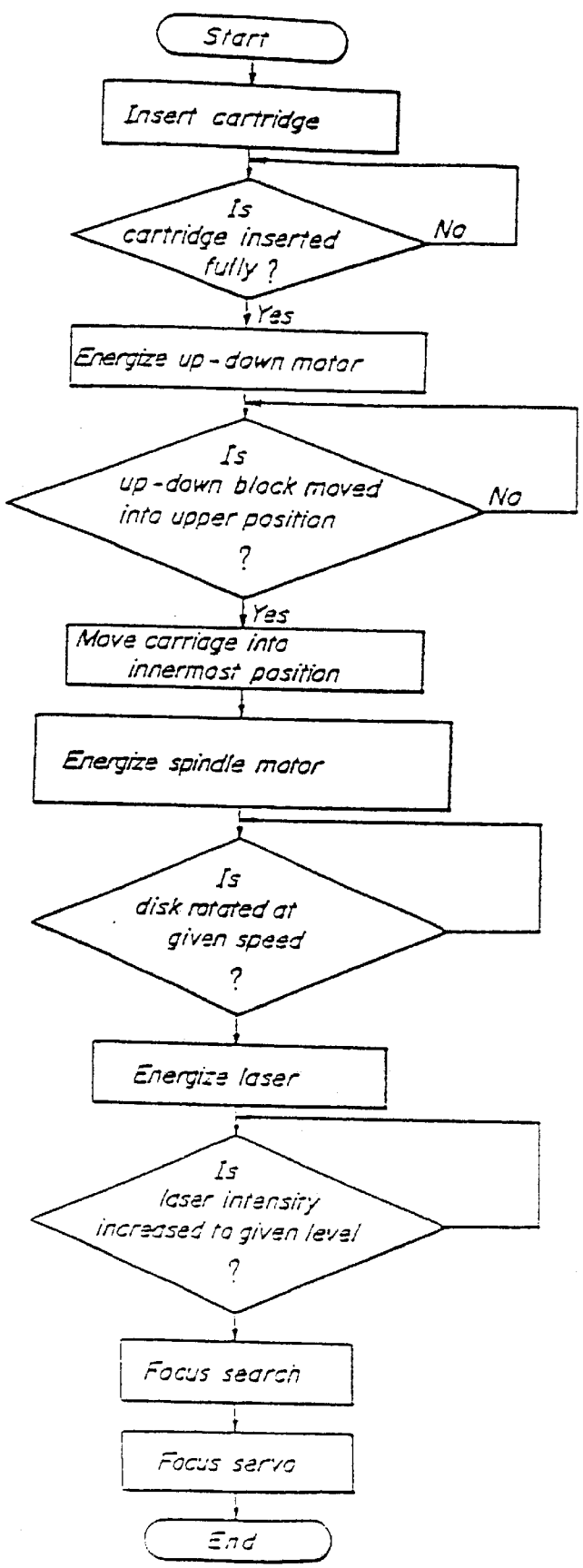
FIG. 5 is a flow chart explaining the operation of the apparatus.

Now the operation of the present embodiment will be explained also with reference to a flow chart illustrated in FIG. 5.

In FIG. 1, above the main body 201, there is arranged a cartridge holder (not shown). At first, the cartridge 251 is inserted into the cartridge holder. The cartridge holder and a mechanism for mounting the cartridge are well known in the art, so that they are not explained further in detail. For instance, the known cartridge holder disclosed in the above mentioned Japanese Patent Application Laid-open Publication Kokai Hei 4-351785 may be used. This known cartridge holder has openings at front and rear sides and the disk is rotatably installed within a cartridge.

The cartridge holder is constructed such that the cartridge 251 can be inserted in parallel with the main body 201. That is to say, when the cartridge 251 is inserted into the cartridge holder, a shutter opening pin on the cartridge holder pushes a shutter of the cartridge 251 in accordance with the movement of the cartridge, and thus an opening of the cartridge on the recording and reproducing side is opened. At the same time, the cartridge 251 is inserted into a space between the objective lens driving unit 203 and the magnetic head 205.

When the cartridge 251 has been inserted upto a given complete inserting position, this is detected by a detector not shown and its detection signal is supplied to the control device 207. Then, the control device 207 controls the up-down motor 280, so that the up-down block 273 is moved upward from a lower home position by means of the pinion gear 279 and rack gear 278. When the up-down block 273 is moved upward and comes close to the cartridge 251, the projections 276 of the up-down block 273 are brought into contact with the positioning recess formed in the lower surface of the cartridge 251. At the same time or after that, the hub 277 of the disk 242 is attracted onto the turntable 241 of the spindle cup 275 by the attracting force produced by the permanent magnet 285.

When no current is supplied to the coil L of the electromagnet 271, the electromagnets 271 and permanent magnet 272 are brought into contact with each other by means of the spring force of the coiled spring 287. The electromagnet 271 and permanent magnet 272 are determined such that under said condition there is still formed a necessary space between the lower surface of the cartridge 251 and the disk 242.

During the upward movement of the up-down block 273, the position of the up-down block 273 is detected by the photoreflector 283. That is to say, the photoreflector 283 projects the light beam toward the reflecting member 282 and the reflected light beam is made incident upon the photoreflector. A position of the reflected light beam spot on the two light receiving regions of the photoreflector 283 is changed in accordance with the distance from the photoreflector and the reflecting member 282. Therefore, this distance can be detected by deriving a difference between outputs of these light receiving regions 283a of the photoreflector 283. The thus detected distance SPDP is supplied to the control device 207.

When it is confirmed that the up-down block 273 has moved into the given upper position from the output signal of the photoreflector 283, the spindle motor 204 is energized and the disk 242 is rotated together with the spindle cup 275. To the driving shaft 288 of the spindle motor 204 is secured a rotary encoder 291 shown in FIG. 2 and the output signal SPFD of the rotary encoder is converted by a F/V (frequency/voltage) and the converted voltage is applied to the control device 207.

Before rotating the disk 242, the carriage 233 is moved into the inner most position of the disk. After it is confirmed that the disk has been rotated at a given constant speed such as 3600 rpm, the control device 207 energizes the semiconductor laser 221 to emit the laser beam. When the semiconductor laser 221 emits the laser beam, this is detected by the first photo-detector 224 and the thus detected signal is supplied to the control device 207. Then, the control device 207 confirms that the laser beam having a give intensity has been emitted from the semiconductor laser 221.

In the manner explained above, after confirming that the spindle motor 204 and spindle cup 275 have been moved into the upper position, the disk 242 has been rotated at the given speed, and the semiconductor laser 221 has emitted the laser beam having the given intensity, the control device 207 initiates the focus control. That is to say, at first the focus search control is effected by supplying the focus search signal from the focus search control circuit 206b to the coil L of the electromagnet 271 under the control of the control device 207. The focus search control itself is well known in the art, so that this will be explained only briefly. In the present embodiment, in the initial condition, the disk 242 is in the nearest position to the objective lens 333, so that usually the focus point of the laser beam situates above the disk 242. When the focus search control is initiated, the spindle cup 275 is gradually moved upward so that the disk 242 is moved away from the objective lens 333. During this period, the focusing error signal generated by the photodetector 264 is supplied to the focus search control circuit 206b via the switch SW and this focusing error signal is compared with a predetermined threshold level. When the focusing error signal exceeds the threshold level, it can be confirmed that the disk 242 has been driven into the dynamic range of the focus servo. Then, the focus search is finished and the focus servo is initiated by the focus servo control circuit 206a. That is to say, the control signal supplied to the focus control coil L is changed in accordance with the focusing error signal supplied from the photodetector 264 such that the laser beam spot is always focused on the information record plane of the disk 242.

As explained above, in the present embodiment, after the control device 207 has confirmed that the spindle motor 204 and spindle cup 275 have been moved into the upper position and the revolving speed of the spindle motor 204 has increased to the predetermined value, and the semiconductor laser 221 has emitted the laser beam having the predetermined intensity, the control device 207 allows the focus search control and focus servo control.

Therefore, according to the invention, the focus search control and focus servo control are not performed when the up-down block 273 is moving and the disk 242 is not rotated at a given revolving speed, so that the reliability of the apparatus is improved and noise due to malfunction can be avoided.

Furthermore, after the objective lens driving unit 203 has been moved into the innermost position, the disk is rotated. Therefore, a possibility that the disk might be brought into contact with the objective lens driving unit 203 can be minimum, because the disk is hardly bent at the innermost position. Therefore, the focus search control can be stably and promptly is performed.

As stated above, the focus search and focus servo control can be carried out by supplying the current to the coil L of the electromagnet 271. When the control device 207 allows the initiation of the control of the focus, at first the focus search signal is supplied to the coil L of the electromagnet 271 and there is produced a repelling force between the electromagnet 271 and the permanent magnet 272, so that the spindle cup 275 and thus the disk 242 is moved upward against the force of the coiled spring 287. During this movement, the focusing error signal is supplied to the focus search control circuit 206b via the switch SW. Therefore, the disk 242 is moved into the dynamic range of the focus servo, and then the focus servo control is initiated. In this case, the focus servo control signal may be superimposed on the focus search control signal at the end of the focus search control. Then, the focus search control can be smoothly and stably transferred to the focus servo control without being affected by the inertia of the movable portion including the disk 242 and spindle cup 275. After that, the focusing error signal detected by the photodetector 264 is supplied to the focus control circuit 206a via the switch SW and the disk 242 is moved up and down in accordance with the focusing error signal.

In this manner, in the present embodiment, the spindle cup 275 constituting the turntable 241 for the disk 242 can be independently moved in the axial direction with respect to the up-down block 273 and the focus search control and focus servo control are performed by moving only the spindle cup 275. In other words, the focus search control and focus servo control can be effected without moving the up-down block 273 having a large weight. Moreover, the objective lens driving unit 203 does not include a permanent magnet for driving the objective lens 333 in the focusing direction, and thus the objective lens driving unit can be made small in size and light in weight and the high speed access can be attained.

Further, in the present embodiment, the cartridge 251 is stably supported during the focus search control, so that some members of the cartridge supporting mechanism are not brought into contact with each other and the generation of noise can be effectively avoided. In this manner, noise can be removed and the reliability is increased, while the advantages of the known apparatuses can be still attained.

Figure 6:
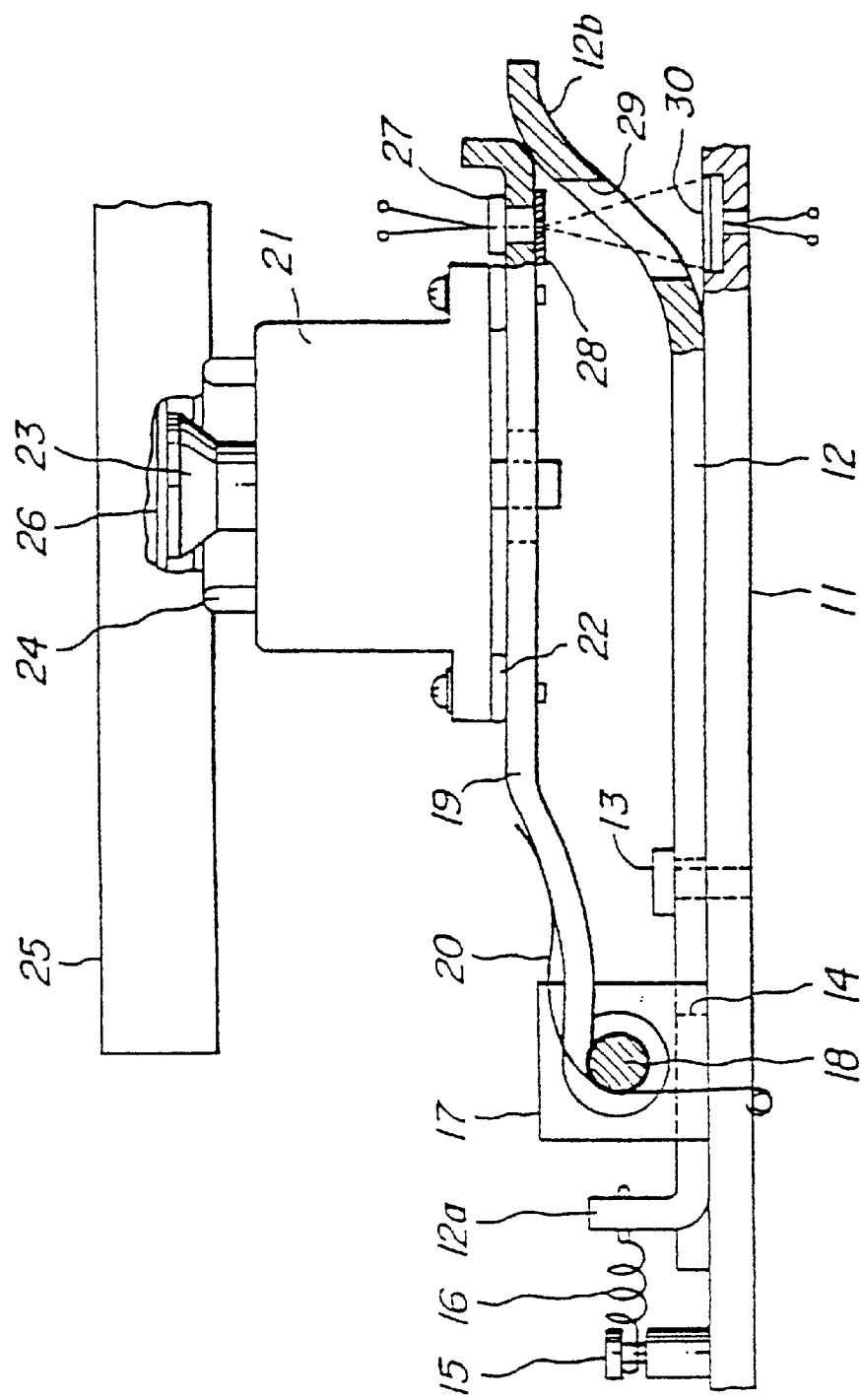
FIG. 6 is a side view showing another embodiment of the disk driving device according to the invention.
Figure 7:
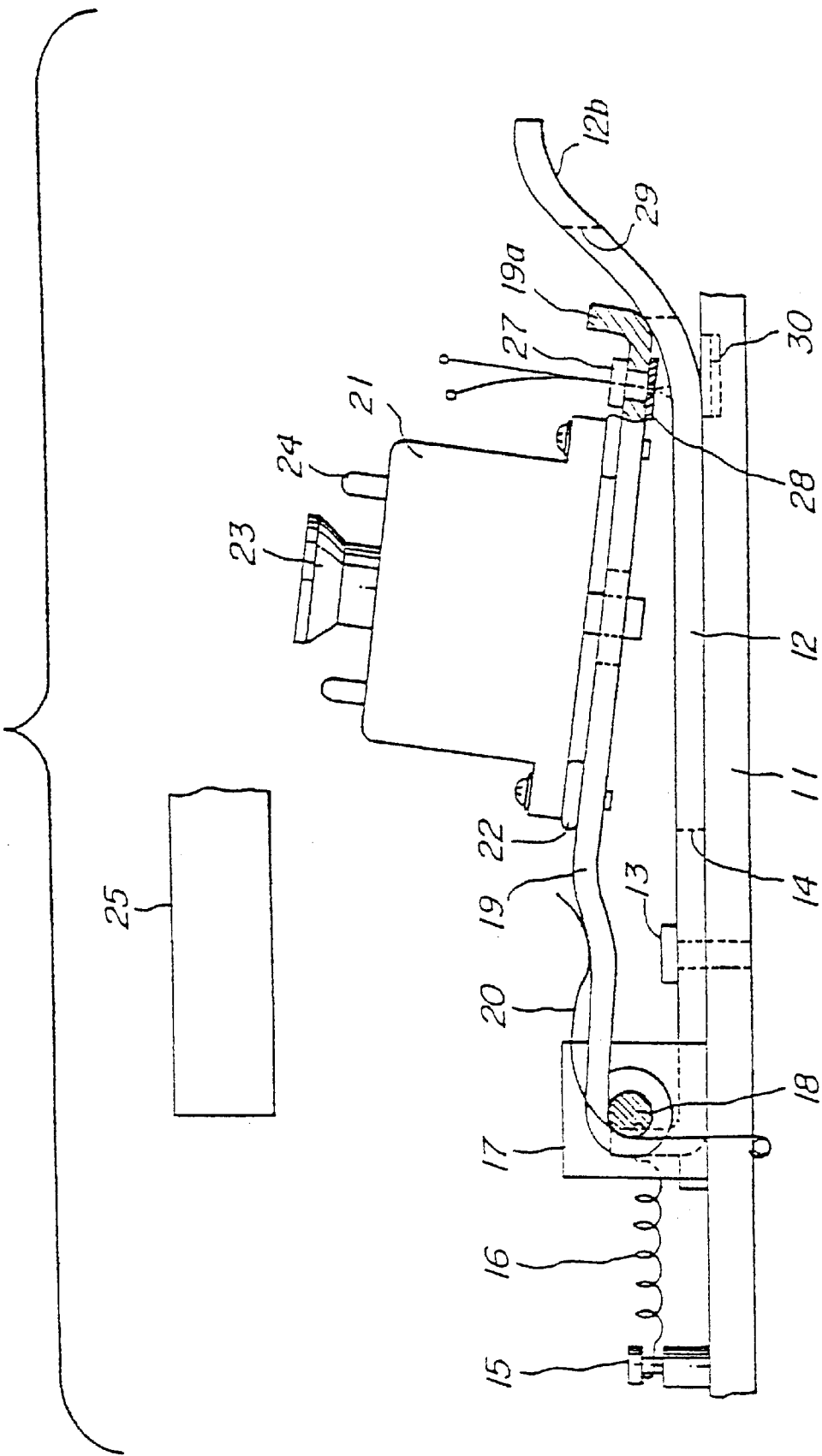
FIG. 7 is a side view of the disk driving device of FIG. 6 in a condition in which the cartridge is not fully inserted.

FIGS. 6 and 7 show another embodiment of the disk driving device of the optical information recording and/or reproducing apparatus according to the invention. In the present embodiment, the up and down movement of the spindle motor and spindle cup is carried out by means of a swingable movement of a plate like member. The disk driving device comprises a base member 11 having a flat upper surface and a driving plate 12 arranged on the upper surface of the base member 11 such that the driving plate can slide thereon in a direction A. On the base member 11 there are provided a plurality of pins 13 and these pins are inserted into recesses 14 formed in the driving plate 12 (in FIG. 6, only one of pins and one of recesses are seen). On the base member 11 there are also secured pins 15 and coiled springs 16 are arrange between the pins 15 and a left hand projection 12a of the driving plate 12, so that the driving plate is biased to be moved in the leftward direction. The driving plate 12 further comprises an operating portion 12b at its right hand end, said operating portion being gradually bent upwardly. To both sides of the base member 11 there are secured upright projections 17 and a shaft 18 is supported by these projections such that the shaft extends horizontally. To the shaft 18, there is swingably secured a supporting plate 19. The supporting plate 18 is biased by a coiled spring 20 to be rotated in the clockwise direction about the shaft 18. On the supporting plate 19 there is secured an up-down block 21 to which a spindle motor is secured. Between the supporting plate 19 and the up-down block 21, there are arranged rubber rings 22 serving as cushion. Similar to the first embodiment, the spindle motor secured to the up-down block 21 includes a driving shaft and a spindle cup 23 is arranged slidably along the driving shaft. On the up-down block 21, there are arranged projections 24 for positioning a cartridge 25 having a magneto-optical information record disk 26. The disk 26 is firmly placed on a turntable formed by the spindle cup 23 by means of the magnetic force.

In the present embodiment, in a right hand end of the supporting plate 19, there is provided a light emitting diode (LED) 27 and a light beam emitted by the LED is projected downward through a stop 28 having a fine hole. In the operating portion 12b of the driving plate 12, there is formed an opening 29, and on the base member there is provided a photodetector 30. FIG. 6 shows a condition in which the cartridge 25 has been fully inserted, the driving plate 12 is moved into the left hand position, and an assembly of the up-down block 21, the spindle motor and spindle cup 23 is moved into an upper position so that the cartridge 25 is positioned by the projections 24 with respect to the spindle cup and the disk 26 is placed on the turntable of the spindle cup. In this condition, the light beam emitted by the LED 27 is transmitted through the opening 29 formed in the operating portion 12b of the driving plate 12 and is made incident upon the photodetector 30.

FIG. 7 illustrates a condition in which the cartridge 25, is removed and the driving plate 12 is moved into the right hand position, so that the supporting plate 19 is rotated in the clockwise direction about the shaft 18. Therefore, the projections 24 are removed from the cartridge 25 and the spindle cup 23 is removed from the disk. In this condition, the light beam emitted from the LED 27 is shielded by the driving plate 12, and thus the light beam is not made incident upon the photodetector 30. In the manner explained above, in the present embodiment, the position of the up-down block 21 and spindle cup 23 can be directly detected by monitoring an output signal of the photodetector 30.

Figure 8:
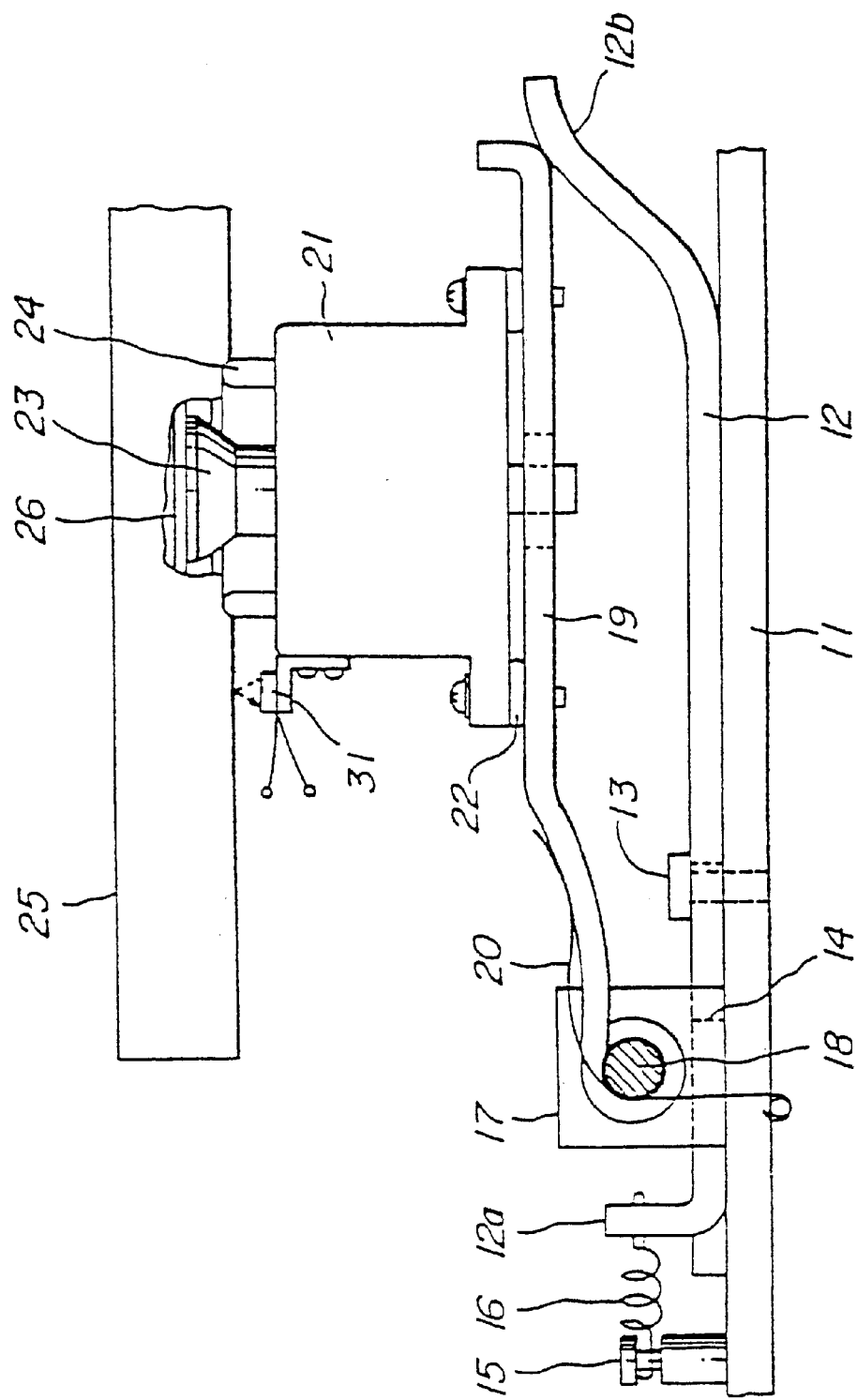
FIG. 8 is a side view illustrating a modification of the disk driving device shown in FIG. 6.

FIG. 8 illustrates a modification of the embodiment shown in FIGS. 6 and 7, so that portions in FIG. 8 which are similar to those depicted in FIGS. 6 and 7 are denoted by the same reference numerals used in FIGS. 6 and 7. In the present embodiment, a photodeflector 31 is arranged on the up-down block 21 such that a light beam reflected by the cartridge 25 can be received by light receiving regions of the photodeflector. In the present embodiment, by monitoring an output signal from the photodeflector 31, it is possible to detect the insertion of the cartridge 25 into the apparatus. When the insertion of the cartridge 25 is detected, a trigger lever not shown is driven to move the driving plate 12 in the left hand direction by means of the action of the springs 16. Then, the right hand edge of the supporting plate 19 slides on the operating portion 12b of the driving plate 12, and thus the supporting plate 19 is rotated in the anti-clockwise direction. Therefore, the cartridge 25 is supported by the projections 24 and the disk 26 is placed on the spindle cup 23. This can be also detected by the output signal of the photodeflector 31. Then, the spindle motor secured to the up-down block 21 is energized to rotate the disk 26 up to a predetermined revolving speed, and after that the focus control is initiated.

In the present embodiment, the photodeflector 31 can detect not only the upward movement of the up-down block 21, spindle motor and spindle cup 23, but also the insertion of the cartridge 25.

FIGS. 9 and 10 illustrate still another embodiment of the disk driving device of the optical recording and/or reproducing apparatus according to the invention. In the present invention, the rotating movement is transferred into the up-down movement by means of an inclined recess and a pin. The disk driving device comprises a base member 41 on which a ring-shaped support member 42 is secured by means of screws 43. On the supporting member 42, there is arranged a rotating cylinder 44 and a clamping ring 45 having a thread formed in its inner surface. That is to say, the supporting ring 42 is clamped between the rotating cylinder 44 and the clamping ring 45 such that the rotating cylinder 44 is rotated about its longitudinal axis together with the clamping ring 45, but could not move in the axial direction. On an outer surface of the rotating cylinder 44, is secured a arcuate rack gear 46 which is engaged with a warm gear 47 coupled with a driving shaft of an up-down motor 48. Therefore, by driving the up-down motor 48, it is possible to rotate the rotating cylinder 44 about the longitudinal axial direction thereof. On the outer surface of the rotating cylinder 44, there is also secured a light shielding plate 49, and a photointerruptor is arranged on the base member 41 such that the light shielding plate 49 is arranged between a light emitting diode 50 and a photodetector 51.

Within the rotating cylinder 44 is arranged an up-down block 52 having secured a spindle motor and a spindle cup 53. The construction of the up-down block 52 with projections 53, spindle motor and spindle cup 54 is substantially same as that of the first embodiment shown in FIG. 1. In FIG. 9, the spindle motor is not seen and only an upper portion of the spindle cup 54 is seen. In the side wall of the rotating cylinder 44, there is formed an inclined recess 55 and on the up-down block 52 there is secured a pin 56 which is inserted into the recess 55. Therefore, by rotating the rotating cylinder 44 by means of the motor 48, the up-down block 52 is moved up and down. It should be noted that the spindle cup 54 can be moved up and down with respect to the spindle motor and up-down block 52 by means of the magnetic driving mechanism including the electromagnet 271 and permanent magnet 272 shown in FIG. 1.

FIG. 10 shows a bottom of the disk driving device. In order to prevent the up-down block 52 from being rotated together with the rotating cylinder 44, in the outer surface of the up-down block, there is formed a recess 57 extending in its axial direction and a guide plate 58 is inserted into the recess 57 such that the up-down block 52 can be moved up and down. In the lower edge of the rotating cylinder 44, there is formed a recess 59, so that the rotation of the rotating cylinder 44 can rotate without being prevented by the guide plate 58.

In the present embodiment, when the cartridge is not fully inserted, the rotating cylinder 44 is in a home position at which the up-down block 52 is in a lower position P1. After the cartridge is inserted into the apparatus, the up-down motor 48 is energized to rotate the rotating cylinder 44. Then, the up-down block 52 is moved upward into an upper position P2. In the upper position P2, a cartridge is supported by the projections 53 and a disk is placed on a turntable formed by the spindle cup 54. During the rotation of the rotating cylinder 44, the light shielding plate 49 is existent between the light emitting diode 50 and the photodetector 51, and thus a light beam is not made incident upon the photodetector 51. When the up-down block 52 is driven into the upper position P2, the light shielding plate 49 is no more existent between the light emitting diode 50 and the photodetector 51, so that the light beam is made incident upon the photodetector. Therefore, by monitoring the output signal from the photodetector 51, it is possible to detect the position of the up-down block 52. After it is confirmed that that the up-down block 52 has been driven into the upper position P2, the spindle motor is energized, and then after it is confirmed that the disk has been rotated at a given speed, the focus control is initiated.

The present invention is not limited to the above explained embodiments, but many modifications and alternations may be conceived by those skilled in the art within the scope of the invention. For instance, in the above mentioned embodiments, the focus control including the focus search control and focus servo control are performed by moving the optical information record disk while the objective lens is remained stationary in the focusing direction, but according to the invention the focus control may be carried out by moving the objective lens in a direction of its optical axis.

What is claimed is:

1. An apparatus for at least reproducing information from an optical record disk, said apparatus comprising:

a spindle motor for rotating said optical record disk;

a movable member having said spindle motor secured thereto and being arranged to be movable in a direction toward said optical record disk as well as in a direction away from said optical record disk, said optical record disk and said spindle motor being coupled with each other under a condition that said movable member has been moved into a predetermined position;

an optical head including at least an objective, lens for projecting at least one light beam onto said optical record disk for at least reading said information from said optical record disk under said condition that said movable member has been moved into said predetermined position;

a movable member driving mechanism for moving said movable member such that after moving said movable member into said predetermined position, said movable member is stopped at said predetermined position at least during a reading operation for reading said information from said optical record disk;

a position detector for detecting said condition in which said movable member has been moved into said predetermined position;

a control means for initiating a rotation of said spindle motor after said position detector detects said condition that said movable member has been moved into said predetermined position; and a carriage having said optical head arranged thereon and being movable between innermost and outermost positions within a movable range over which said carriage is moved in a radial direction of said optical record disk by a controlled drive, initial irradiation of said light beam onto said optical record disk being performed in a condition in which said carriage has been positioned in said innermost position of said movable range.

2. An apparatus according to claim 1, wherein said movable member is driven into said predetermined position by means of an up-down motor.

3. An apparatus according to claim 1, wherein said optical record disk is installed within a disk cartridge having a releasable shutter.

4. An apparatus according to claim 1, wherein said apparatus further includes a semiconductor laser emitting said light beam to be impinged upon said optical record disk, a photo-detector for receiving a part of light emitted from said semiconductor laser, and an automatic power control circuit coupled with said photo-detector.

5. An apparatus according to claim 4, wherein a focus control is initiated under a condition that said automatic power control circuit has been operated.

6. An apparatus according to claim 1, wherein after said spindle motor has operated, a projection of said light beam upon said optical record disk is initiated.

7. An apparatus according to claim 1, wherein a single light spot is irradiated from said optical head onto said optical record disk, and a focus error signal and a tracking error signal are detected in accordance with a reflected light beam from said optical record disk.

8. An apparatus according to claim 1, wherein said information has been recorded in said optical record disk by taking advantage of at least thermal energy of light irradiated onto said optical record disk.

9. An apparatus according to claim 8, wherein a single light spot is irradiated from said optical head onto said optical record disk.

10. An apparatus according to claim 1, wherein said movable member driving mechanism includes a driving member which is movable in a rectilinear direction parallel with an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

11. An apparatus according to claim 1, wherein said movable member driving mechanism includes a driving member which is rotatable about an imaginary line perpendicular to an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

12. An apparatus according to claim 8, wherein said information has been recorded in said optical record disk based on magneto-optical recording mechanism.

13. An apparatus according to claim 1, wherein said information has been recorded in said optical record disk on the basis of function that thermal energy of light irradiated onto said optical record disk changes a property of said optical record disk.

14. An apparatus according to claim 13, wherein a single light spot is irradiated from said optical head onto said optical record disk.

15. An apparatus according to claim 14, wherein said movable member driving mechanism includes a driving member which is movable in a rectilinear direction parallel with an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

16. An apparatus according to claim 14, wherein said movable member driving mechanism includes a driving member which is rotatable about an imaginary line perpendicular to an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

17. An apparatus according to claim 13, wherein said information has been recorded in said optical record disk based on magneto-optical recording mechanism.

18. An apparatus according to claim 1, wherein said movable member includes a first member which is displaced about an imaginary straight line parallel with an imaginary plane which is substantially parallel with a record surface of said optical record disk, a second member, and a resilient member interposed between said first member and said second member, and at least said spindle motor is secured to said second member.

19. An apparatus according to claim 18, wherein said first member is formed by a plate-like supporting means and said second member is formed by an up-down block.

20. An apparatus according to claim 18, wherein said resilient member is made of rubber.

21. An apparatus according to claim 20, wherein said resilient member is composed of a plurality of rubber rings.

22. An apparatus for at least reproducing information from an optical record disk, said apparatus comprising:
- a spindle motor for rotating said optical record disk;
- a movable member having said spindle motor secured thereto and being arranged to be movable in a direction toward said optical record disk as well as in a direction away from said optical record disk, said optical record disk and said spindle motor being coupled with each other under a condition that said movable member has been moved into a predetermined position;
- an optical head including at least an objective lens for projecting at least one light beam onto said optical record disk for at least reading said information from said optical record disk under said condition that said movable member has been moved into said predetermined position;
- a movable member driving mechanism for moving said movable member such that after moving said movable member into said predetermined position, said movable member is stopped at said predetermined position at least during a reading operation for reading said information from said optical record disk;
- a position detector for detecting said condition in which said movable member has been moved into said predetermined position;
    - a carriage having said optical head arranged thereon and being movable in a radial direction of said optical record disk; and
- a control means for initiating a rotation of said spindle motor after said position detector detects said condition that said movable member has been moved into said predetermined position, and for initiating irradiation of said light beam from said optical head onto said optical record disk under a condition that said carriage has been positioned at a given position on an inner side of said optical record disk and after said position detector detects said condition that said movable member has been moved into said predetermined position.

23. An apparatus according to claim 22, wherein said movable member is driven into said predetermined position by means of an up-down motor.

24. An apparatus according to claim 22, wherein said optical record disk is installed within a disk cartridge having a releasable shutter.

25. An apparatus according to claim 22, wherein said apparatus further includes a semiconductor laser emitting said light beam to be impinged upon said optical record disk, a photodetector for receiving a part of light emitted from said semiconductor laser, and an automatic power control circuit coupled with said photo-detector.

26. An apparatus according to claim 25, wherein a focus control is initiated under a condition that said automatic power control circuit has been operated.

27. An apparatus according to claim 22, wherein after said spindle motor has operated, a projection of said light beam upon said optical record disk is initiated.

28. An apparatus according to claim 22, wherein a single light spot is irradiated from said optical head onto said optical record disk, and a focus error signal and a tracking error signal are detected in accordance with a reflected light beam from said optical record disk.

29. An apparatus according to claim 22, wherein said information has been recorded in said optical record disk by taking advantage of at least thermal energy of light irradiated onto said optical record disk.

30. An apparatus according to claim 29, wherein a single light spot is irradiated from said optical head onto said optical record disk.

31. An apparatus according to claim 22, wherein said movable member driving mechanism includes a driving member which is movable in a rectilinear direction parallel with an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

32. An apparatus according to claim 22, wherein said movable member driving mechanism includes a driving member which is rotatable about an imaginary line perpendicular to an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

33. An apparatus according to claim 29, wherein said information has been recorded in said optical record disk based on magneto-optical recording mechanism.

34. An apparatus according to claim 22, wherein said information has been recorded in said optical record disk on the basis of function that thermal energy of light irradiated onto said optical record disk changes a property of said optical record disk.

35. An apparatus according to claim 34, wherein a single light spot is irradiated from said optical head onto said optical record disk.

36. An apparatus according to claim 35, wherein said movable member driving mechanism includes a driving member which is movable in a rectilinear direction parallel with an imaginary plane which is substantially in parallel with a record surface of said optical record disk, and said driving member has an inclined portion which is inclined with respect to said imaginary plane, a part of said movable member being brought into contract with said inclined portion of said driving member and said movable member being positioned into said predetermined position when said position detector detects a condition that a part of said driving member has been moved into a previously determined position.

37. An apparatus according to claim 35, wherein said movable member driving mechanism includes a driving member which is rotatable about an imaginary line perpendicular to an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

38. an apparatus according to claim 34, wherein said information has been recorded in said optical record disk based on magneto-optical recording mechanism.

39. An apparatus according to claim 22, wherein said movable member includes a first member which is displaced about an imaginary straight line parallel with an imaginary plane which is substantially parallel with a record surface of said optical record disk, a second member, and a resilient member interposed between said first member and said second member, and at least said spindle motor is secured to said second member.

40. An apparatus according to claim 39, wherein said first member is formed by a plate-like supporting means and said second member is formed by an up-down block.

41. An apparatus according to claim 39, wherein said resilient member is made of rubber.

42. An apparatus according to claim 41, wherein said resilient member is composed of a plurality of rubber rings.

43. An apparatus for at least reproducing information from an optical record disk, said apparatus comprising:
   a spindle motor for rotating said optical record disk;
   a movable member having said spindle motor secured thereto and being arranged to be movable in a direction toward said optical record disk as well as in a direction away from said optical record disk, said optical record disk and said spindle motor being coupled with each other under a condition that said movable member has been moved into a predetermined position;
   an optical head including at least an objective lens for projecting at least one light beam onto said optical record disk for at least reading said information from said optical record disk under said condition that said movable member has been moved into said predetermined position;
   a movable member driving mechanism for moving said movable member such that after moving said movable member into said predetermined position, said movable member is stopped at said predetermined position at least during a reading operation for reading said information from said optical record disks;
   a position detector for detecting said condition in which said movable member has been moved into said predetermined position;
   a carriage having said optical head arranged thereon and being movable by a controlled drive in a radial direction of said optical record disk between a first position closer to a rotating axial center of said optical record disk and a second position far from the said rotating axial center; and
   a control means for initiating a rotation of said spindle motor after said position detector detects said condition that said movable member has been moved into said predetermined position, and for initiating irradiation of said light beam from said optical head onto said optical record disk under a condition that said carriage has been positioned at a position which is closer to said first position than to said second position and after said position detector detects said condition that said movable member has been moved into said predetermined position.

44. An apparatus according to claim 43, wherein said movable member is driven into said predetermined position by means of an up-down motor.

45. An apparatus according to claim 43, wherein said optical record disk is installed within a disk cartridge having a releasable shutter.

46. An apparatus according to claim 43, wherein said apparatus further includes a semiconductor laser emitting said light beam to be impinged upon said optical record disk, a photo-detector for receiving a part of light emitted from said semiconductor laser, and an automatic power control circuit coupled with said photo-detector.

47. An apparatus according to claim 46, wherein a focus control is initiated under a condition that said automatic power control circuit has been operated.

48. An apparatus according to claim 43, wherein after said spindle motor has operated, a projection of said light beam upon said optical record disk is initiated.

49. An apparatus according to claim 43, wherein a single light spot is irradiated from said optical head onto said optical record disk, and a focus error signal and a tracking error signal are detected in accordance with a reflected light beam from said optical record disk.

50. An apparatus according to claim 43, wherein said information has been recorded in said optical record disk by taking advantage of at least thermal energy of light irradiated onto said optical record disk.

51. An apparatus according to claim 50, wherein a single light spot is irradiated from said optical head onto said optical record disk.

52. An apparatus according to claim 43, wherein said movable member driving mechanism includes a driving member which is movable in a rectilinear direction parallel with an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

53. An apparatus according to claim 43, wherein said movable member driving mechanism includes a driving member which is rotatable about an imaginary line perpendicular to an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

54. An apparatus according to claim 50, wherein said information has been recorded in said optical record disk based on magneto-optical recording mechanism.

55. An apparatus according to claim 43, wherein said information has been recorded in said optical record disk on the basis of function that thermal energy of light irradiated onto said optical record disk changes a property of said optical record disk.

56. An apparatus according to claim 55, wherein a single light spot is irradiated from said optical head onto said optical record disk.

57. An apparatus according to claim 56, wherein said movable member driving mechanism includes a driving member which is movable in a rectilinear direction parallel with an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

58. An apparatus according to claim 56, wherein said movable member driving mechanism includes a driving member which is rotatable about an imaginary line perpendicular to an imaginary plane which is substantially in parallel with a record surface of said optical record disk, and said driving member has an inclined portion which is inclined with respect to said imaginary plane, a part of said movable member being brought into contact with said inclined portion of said driving member and said movable member being positioned into said predetermined position when said position detector detects a condition that a part of said driving member has been moved into a previously determined position.

59. An apparatus according to claim 55, wherein said information has been recorded in said optical record disk based on magneto-optical recording mechanism.

60. An apparatus according to claim 43, wherein said movable member includes a first member which is displaced about an imaginary straight line parallel with an imaginary plane which is substantially parallel with a record surface of said optical record disk, a second member, and a resilient member interposed between said first member and said second member, and at least said spindle motor is secured to said second member.

61. An apparatus according to claim 60, wherein said first member is formed by a plate-like supporting means and said second member is formed by an up-down block.

62. An apparatus according to claim 60, wherein said resilient member is made of rubber.

63. An apparatus according to claim 62, wherein said resilient member is composed of a plurality of rubber rings.

* * * * *

UNITED STATES PATENT AND TRADEMARK OFFICE
CERTIFICATE OF CORRECTION

PATENT NO.     : 6,445,660 B1  
DATED          : September 3, 2002  
INVENTOR(S)    : Kunio Yamamiya It is certified that error appears in the above-identified patent and that said Letters Patent is hereby corrected as shown below:

Column 15,
Line 8, should read as follows: -- an optical head including at least an objective lens for -- not "an optical head including at least an objective, lens for"

Signed and Sealed this

Twenty-fifth Day of February, 2003

JAMES E. ROGAN
*Director of the United States Patent and Trademark Office*